United States Patent
Maroli et al.

(10) Patent No.: US 11,370,198 B2
(45) Date of Patent: Jun. 28, 2022

(54) WEAR-RESISTANT IRON-BASED ALLOY COMPOSITIONS COMPRISING CHROMIUM

(71) Applicant: HÖGANÄS AB (PUBL), Höganäs (SE)

(72) Inventors: Barbara Maroli, Höganäs (SE); Robert Frykholm, Ödåkra (SE); Sven Bengtsson, Höganäs (SE); Karin Frisk, Enebyberg (SE)

(73) Assignee: HÖGANÄS AB (PUBL), Höganäs (SE)

( * ) Notice: Subject to any disclaimer, the term of this patent is extended or adjusted under 35 U.S.C. 154(b) by 0 days.

(21) Appl. No.: 17/257,041

(22) PCT Filed: Jun. 25, 2019

(86) PCT No.: PCT/EP2019/066838
§ 371 (c)(1),
(2) Date: Dec. 30, 2020

(87) PCT Pub. No.: WO2020/007654
PCT Pub. Date: Jan. 9, 2020

(65) Prior Publication Data
US 2021/0197524 A1 Jul. 1, 2021

(30) Foreign Application Priority Data
Jul. 2, 2018 (EP) .................... 18181105

(51) Int. Cl.
*B32B 15/01* (2006.01)
*B23K 26/34* (2014.01)
(Continued)

(52) U.S. Cl.
CPC ............ *B32B 15/011* (2013.01); *B22F 1/05* (2022.01); *B23K 26/34* (2013.01);
(Continued)

(58) Field of Classification Search
None
See application file for complete search history.

(56) References Cited

FOREIGN PATENT DOCUMENTS

| CN | 101469392 | * | 7/2009 |
| EP | 0223202 A2 | | 5/1987 |

(Continued)

OTHER PUBLICATIONS

International Search Report and Written Opinion issued in corresponding International Patent Application No. PCT/EP2019/066838, 12 pages (dated Oct. 17, 2019).

(Continued)

*Primary Examiner* — Xiaobei Wang
(74) *Attorney, Agent, or Firm* — Buchanan Ingersoll & Rooney P.C.

(57) ABSTRACT

An iron-based alloy composition including: boron (B): 1.6-2.4 wt. %; carbon (C): 2.2-3.0 wt. %; chromium (Cr): 3.5-5.0 wt. %; manganese (Mn): below 0.8 wt. %; molybdenum (Mo): 16.0-19.5 wt. %; nickel (Ni): 1.0-2.0 wt. %; silicon (Si): 0.2-2.0 wt. %; vanadium (V): 10.8-13.2 wt. %; and balanced with iron (Fe). Further, an item including a substrate portion and a hardfacing coating bonded to the substrate portion, wherein the hardfacing coating is made by an overlay welding process using the iron-based alloy composition.

9 Claims, 5 Drawing Sheets

(51) Int. Cl.
  *C22C 38/02* (2006.01)
  *C22C 38/04* (2006.01)
  *C22C 38/44* (2006.01)
  *C22C 38/46* (2006.01)
  *C22C 38/54* (2006.01)
  *B23K 35/30* (2006.01)
  *B22F 1/05* (2022.01)

(52) U.S. Cl.
  CPC .......... *B23K 35/3053* (2013.01); *C22C 38/02* (2013.01); *C22C 38/04* (2013.01); *C22C 38/44* (2013.01); *C22C 38/46* (2013.01); *C22C 38/54* (2013.01); *B22F 2301/35* (2013.01); *B22F 2304/10* (2013.01)

(56) References Cited

FOREIGN PATENT DOCUMENTS

| | | |
|---|---|---|
| RU | 2006108657 A | 9/2007 |
| SU | 549499 A1 | 3/1977 |
| SU | 1447917 A1 | 12/1988 |
| WO | 2016099390 A1 | 6/2016 |
| WO | 2017040775 A1 | 3/2017 |

OTHER PUBLICATIONS

Office Action and Search Report dated May 11, 2021, by the Federal Service for Intellectual Property in Russian Patent Application No. 2021101907/05(003872) and an English Translation of the Office Action. (17 pages).

\* cited by examiner

ALLOY 26, 0.2wt% Si

ALLOY 27, 1wt% Si

ALLOY 28, 2wt% Si

ALLOY 29, 0.5wt% Si

ALLOY 30, 0.7wt% Si

ALLOY 11, 0.7 wt.% Si    ALLOY 13, 1.4 wt.% Si

WEAR-RESISTANT IRON-BASED ALLOY COMPOSITIONS COMPRISING CHROMIUM

The present invention relates in one aspect to an iron-based alloy composition for hardfacing applications. In a further aspect, the invention relates to a hardfacing coating made from an iron-based alloy composition. In a yet further aspect the invention relates to a method of hardfacing an item using an iron-based alloy composition as a coating material. Furthermore, in one aspect, the invention relates to hardfacing by overlay welding using an iron-based alloy composition as a coating material. In a particular aspect, the invention relates to hardfacing by laser cladding using an iron-based alloy composition as a coating material. In another particular aspect, the invention relates to hardfacing by plasma arc transfer (PTA) welding using an iron-based alloy composition as a coating material.

BACKGROUND OF THE INVENTION

Hardfacing is a metallurgical technique to extend the lifetime of tools and other parts intended for use in very harsh operational conditions by providing the most exposed portions of such items with a wear resistant coating layer. For example, the coating may be applied to selected surface regions as a protective layer in the production of new parts, or may be applied to restore worn surfaces in a repair process. Typically, a hardfacing coating is applied as an overlay welded layer metallurgically bonded to a substrate portion of an item.

Hardfacing materials are complex alloys that are usually designed for particular applications in order to provide protection against deterioration mechanisms, such as abrasive wear, impact wear, and erosion. Typical applications may include, but are not limited to oil and gas drilling, mining, cement production, agricultural and earth-moving machinery, moulding tools, and turbine components for e.g. aerospace and power generation. However, many of the best performing known hardfacing materials have several drawbacks including high cost, environmental impact, and very limited resistance when it comes to combined wear scenarios, where different types of wear mechanism contribute in combination to the deterioration of the item under realistic operational conditions.

Different techniques for applying a hardfacing coating to a substrate exist. One of the challenges in this context is that each technique has process type specific characteristics influencing the properties of the obtained coating, and thus the actually achieved wear resistance. For example, laser cladding processes have the advantage of fast application with a relatively small heat affected zone and a low degree of substrate dilution as compared to other types of overlay welding techniques. However, these characteristics are linked to a relatively fast cooling rate of the welding melt pool and entail an increased tendency to the formation of cracks and/or porosity to occur in the coating. An increased tendency to crack formation and porosity may lead to excessive wear as compared to e.g. process using the slower plasma transferred arc (PTA) welding technique. The PTA-technique, on the other hand, may lead to a larger heat affected zone, increased dilution from the substrate and risk for distortion of the part to be coated. Therefore, there is a need for alloy compositions that can easily be adapted to or even optimized for a particular hardfacing technique in order to achieve coatings with combined resistance to abrasive and impact wear, good weldability meaning a reduced tendency to pore and crack formation, and lower cost.

Some of the issues mentioned above have been addressed in previous studies published by the inventors, see e.g.: Maroli et al. on "Effect of Type and Amount of Tungsten Carbides on the Abrasive Wear of Laser Cladded Nickel Based Coatings", Int. Thermal Spray Conf.—ITSC 2015, Long Beach, Calif., USA; Bengtsson et al. on "New Hardfacing Material with High Impact Wear Resistance", Int. Thermal Spray Conf.—ITSC 2016, Shanghai; Maroli et al. on "Iron Based Hardfacing Alloys for Abrasive and Impact Wear", Int. Thermal Spray Conf. —ITSC 2017, Dusseldorf, Germany; and Maroli et al. on "Cost Effective Iron Based Alloys for Abrasive Wear" Int. Thermal Spray Conf. —ITSC 2018, Orlando, USA. These studies present amongst others measurements quantifying the properties of certain iron-based alloys and their usefulness in cost effective hardfacing applications. Other studies have focused on completely avoiding chromium as a component in hardfacing alloys; see e.g. Eibl, WO 2017/040775, relating to "Chromium Free and Low-Chromium Wear Resistant Alloys". However, even these improved alloy compositions may still face some of the above-mentioned limitations. Therefore, there is a continued need for finding alternatives, and preferably improved alloys for hardfacing, overcoming or improving on at least some of the above-mentioned issues.

Furthermore, it has been found that the best performing ones amongst the known hardfacing alloys can be rather sensitive to the choice of welding technique and to the process parameters used for applying the hardfacing alloy as a coating to a substrate portion. At the same time, the available equipment for hardfacing may determine the processing type, and processing parameters may be subject to external constraints dictated by the complexity of a specific hardfacing task. A lack of tolerance with respect to changing processing parameters may pose yet another challenge for designing a hardfacing process to the desired outcome in terms of quality and wear resistance of the coating. It is therefore also desirable to provide a hardfacing alloy and method that is susceptible of coping with such factors, yet providing high wear resistance, in particular in a combined wear type scenario.

SUMMARY OF THE INVENTION

A first aspect of the invention relates to an iron-based alloy composition comprising: boron (B): 1.6-2.4 wt. %; carbon (C): 2.2-3.0 wt. %; chromium (Cr): 3.5-5.0 wt. %; manganese (Mn): below 0.8 wt. %; molybdenum (Mo): 16.0-19.5 wt. %; nickel (Ni): 1.0-2.0 wt. %; silicon (Si): 0.2-2.0 wt. %; vanadium (V): 10.8-13.2 wt. %; and balanced with iron (Fe).

The iron-based alloy composition is for hardfacing a substrate by means of known hardfacing techniques, such as overlay-welding using e.g. plasma transfer arc (PTA) welding or laser cladding techniques. The alloy may be provided in any form suitable for being fed to and processed by the employed hardfacing apparatus into a hardfacing coating. Typical substrates are low-alloyed steel materials, such as those commonly used for tooling in any of the above-mentioned fields of application.

The iron-based alloy composition is designed to be easy to weld with few to no cracks and without detrimental porosity, at least for certain welding techniques, such as typical plasma transfer arc welding or similar overlay welding techniques having comparable time dependence of the melt pool cool-down. The iron-based alloy composition is further designed to provide high hardness, such as well above 60 HRC, high abrasive wear resistance, such as below 15 mm³, in ASTM G65 procedure A, and good impact resistance, as well as for stable microstructure control.

With Cr additions in the range as specified herein, coatings produced using the alloy composition exhibit a surprising combination of high hardness, abrasive wear resistance and impact wear resistance. At too low levels of Cr in particular the impact wear resistance observed for the coatings produced using such alloys drops especially at low impact energies below 15 J. At too high levels of Cr, both hardness and abrasive wear resistance drop. Within the suggested window a good combination of hardness, abrasive wear resistance and impact wear resistance is obtained. The alloy composition is also easy to apply in a crack free manner, e.g. using PTA welding processes or other overlay welding techniques with a time dependence of the melt pool cool-down that is comparable to that typically encountered in PTA welding processes.

The Si content is optimized for balance between hard phases and eutectic structure. In fact, a particular merit of the present invention resides in the insight that Si can be used in a surprisingly efficient and reliable manner to control the formation of borides. The upper limit is set to ensure sufficient formation of the eutectic structure, which is necessary for sufficient hardness and wear resistance.

The advantages of adding Chromium and Silicon in combination, with the particular ranges selected for the Chromium and Silicon content include an improved versatility of the coating system as compared to known hardfacing alloys, due to a surprisingly effective combined wear resistance where different types of wear mechanisms as well as coating quality come into play, as seen e.g. in analyses of the hardness, abrasive wear resistance, impact wear resistance, and the like for hardfacing coating samples produced using the iron-based alloy composition according to embodiments of the invention. Apparently, the Si addition synergistically enhances the effect of Cr addition, and provides amongst others an enhanced tunability of wear related coating properties as compared to known compositions. A surprisingly simple tuning mechanism is observed within the ranges of Cr and Si content according to embodiments of the invention as disclosed herein, thereby providing a surprisingly effective control of coating properties. For example, this tuning mechanism allows for a well-controlled adaptation of the coating alloy system to specific requirements of a particular coating process to be used in a given application, without compromising the overall wear resistance performance of such a coating in a combined wear mechanism scenario. This allows a skilled person using the disclosed coating alloy system to design a coating alloy composition according to a desired wear resistance, e.g. by setting a desired Cr content within the given range, and merely varying the Si content for a given Cr content in order to optimize the Si content for the combined wear scenario of a given application. For example, the coating may be optimized for maximum hardness and abrasive wear resistance at lower Si contents.

Further according to some embodiments of the iron-based alloy composition, the amount of silicon is 0.2-1.5 wt. %, preferably 0.5-1 wt. %. This range of Si-content, and in particular the preferred range of Si content between 0.5-1 wt. %, supports a surprisingly good combined wear resistance with high hardness and very good abrasive wear resistance performance, while at least keeping a good impact wear resistance.

A minimum Si content of about 0.2 wt. %, or at least 0.3 wt. %, is beneficial for an improved behaviour of the alloy material in powder production, in particular when using atomization techniques, such as gas atomization or water atomization and during overlay welding.

Advantageously according to some embodiments of the iron-based alloy composition, the amount of silicon is, 1.5 wt. % or below, or preferably 1 wt. % or below. Thereby, an enhanced tuning response to varying the Si content is achieved, which allows for a good control of the microstructure of the alloy composition when processed into a hardfacing coating. As mentioned above, the addition of Si in selected amounts apparently provides, in synergy with the above selected ranges for the Cr content, an alloy composition for hardfacing coatings with a surprising combination of high hardness values, abrasive wear resistance, and/or impact wear resistance, which can be produced in a stable manner, due to a good microstructure control in the processed alloy.

As discussed in more detail below, an important insight underlying the present invention relies on an analysis of the microstructure of the processed alloys. The microstructure analysis reveals that the skilled person may use the present invention to design an alloy composition optimized for a particular application by setting the Chromium content of the iron-based alloy composition, and further adding Silicon within carefully selected ranges allowing for tuning the distribution of different phases in the microstructure of the processed material, in order to achieve desired properties of combined wear resistance including combinations of hardness, abrasive wear, and/or impact wear. Notably, Silicon was found to affect the amount of primary hard phase particles formed in the iron-based alloys with Cr additions, more particularly the amount of primary boride particles. A particularly advantageous range for the Silicon content for tuning the alloy properties was found to occur below 1.5 wt. %, or below 1.4 wt. %, or below 1.3 wt. %, or below 1.2 wt. %, or below 1.1 wt. %, or below 1 wt. %, and above 0.2 wt. %, or above 0.3 wt. %, or above 0.4 wt. %, or above 0.5 wt. %.

Further according to some embodiments of the iron-based alloy composition, the amount of boron is 1.8-2.3 wt. %. In some embodiments, the amount of boron is 1.7-2.3%. Advantageously according to some embodiments the amount of boron is 1.8-2.2 wt. %.

Further according to some embodiments of the iron-based alloy composition, the amount of chromium is 3.5-4.5 wt. %.

Advantageously according to some embodiments of the iron-based alloy composition, the amount of chromium is at least 3.3 wt. %, at least 3.4 wt. %, or at least 3.5 wt. %. Further according to some embodiments of the iron-based alloy composition, the amount of chromium is up to 4.8 wt. %, up to 4.6 wt. %, up to 4.4 wt. %, or up to 4.2 wt. %. Furthermore, according to some embodiments, the amount of chromium is within any combination of a minimum amount of chromium and a maximum amount of chromium, wherein the minimum amount of chromium is one of 3.3 wt. %, 3.4 wt. %, and 3.5 wt. %, and wherein the maximum amount of chromium is one of 4.2 wt. %, 4.4 wt. %, 4.6 wt. %, and 4.8 wt. %.

Thereby both a very high hardness and abrasive wear resistance of a hardfacing coating produced from the iron-based alloy composition is achieved without compromising on other wear resistance performance parameters, such as impact wear resistance. This allows for reliable hardfacing processes with a stable processing result that is also more robust to intentional or un-intentional variations in processing parameters. A synergistic improvement in all these respects is achieved for the selected ranges of Cr content in combination with the addition of Si in agreement with the above-mentioned advantageous amounts of up to 1.5 wt. %, up to 1.4 wt. %, up to 1.3 wt. %, up to 1.2 wt. %, up to 1.1 wt. %, or preferably up to 1 wt. %.

Advantageously according to some embodiments of the iron-based alloy composition, the amount of carbon is 2.4-2.9 wt. %. Thereby a sufficient minimum amount of Carbon for adequate formation of primary carbides and martensite is still ensured.

Further according to some embodiments, the iron-based alloy composition comprises impurities, wherein a total amount of the impurities in the iron-based alloy composition is below 1 wt. %. When producing an alloy in large batches on an industrial scale, remainders of impurities are typically unavoidable, but a total amount of the impurities in the iron-based alloy composition can typically be kept below 1 wt. %, or even below 0.5 wt. %. Generally, impurities are further components other than those specified as alloying elements making up the alloy composition. In the present case, any element other than the alloying elements B, C, Cr, Mn, Mo, Ni, Si, V, and Fe are considered as impurities in the iron-based alloy composition. Typical impurities include one or more of N, O, S, Cu, Co. Impurities may be unavoidable or intentionally added further components. The total amount of impurities will typically not exceed the above-mentioned ranges.

Further according to some embodiments of the iron-based alloy composition the alloy composition is a powder composition. Thereby, the iron-based alloy composition is suitable for use in powder-based hardfacing coating techniques. This includes e.g. compatibility with apparatus used for applying a hardfacing coating to a substrate, such as apparatus for powder-based PTA overlay-welding or for powder based laser cladding. The powder may, for example be prepared by any suitable known technique; such as by gas atomization or water atomization. Specified particle size cuts may be prepared using standard techniques known in the art, such as using any known suitable sieving technique, according to predefined specifications for the particle size compatible with the powder feeding system of the hardfacing equipment selected.

Further according to some embodiments of the iron-based alloy composition, at least 95 wt. % of the powder composition has a particle size of up to 300 µm, or up to 250 µm, or up to 200 µm, or up to 150 µm, and/or wherein at least 95 wt. % of the powder composition has a particle size of at least 5 µm, or at least 10 µm, or at least 20 µm, or at least 30 µm, or at least 40 µm, or at least 50 µm, i.e.: according to some embodiments, at least 95 wt. % of the powder composition has a particle size of up to 300 µm, or up to 250 µm, or up to 200 µm, or up to 150 µm; furthermore, according to some embodiments, at least 95 wt. % of the powder composition has a particle size of at least 5 µm, or at least 10 µm, or at least 20 µm, or at least 30 µm, or at least 40 µm, or at least 50 µm; furthermore, according to some embodiments, at least 95 wt. % of the powder composition has a particle size within any combination of a specified minimum particle size and a specified maximum particle size, wherein the minimum particle size is one of 5 µm, 10 µm, 20 µm, 30 µm, 40 µm, and 50 µm, and wherein the maximum particle size is one of 150 µm, 200 µm, 250 µm, and 300 µm. All particle sizes as specified herein are determined by dry sieving according to European Standard EN 24 497:1993 as approved by the European Committee for Standardization (CEN) on Apr. 2, 1993, wherein EN 24 497:1993 endorses ISO 4497:1983.

As mentioned above, a particle size cut is advantageously adapted according to specifications for compatibility with powder feeding devices of the coating equipment to be used for applying the hardfacing coating.

The suitability for a powder-based hardfacing equipment may further imply an overall maximum particle size not to be exceeded, which may lie above the upper limit for the specified particle size range, but where otherwise at least 95 wt. % fall within the specified range of particle sizes. Advantageously according to some embodiments of the iron-based alloy composition, at least 97 wt. %, or at least 98 wt. %, or at least 99 wt. %, or at least 99.9 wt. % of all particles fall within the specified range of particle sizes. The overall maximum particle size not to be exceeded will depend on the actual specification of the powder-feed apparatus/mechanism to be used, and may for example be up to 350 µm, up to 300 µm, up to 250 µm, or up to about 200 µm. The particle size cut may be prepared by any suitable method known in the art of powder preparation, such as sieving by using sieve cloths with different mesh sizes. As already mentioned above, all particle sizes as specified in this application are determined by dry sieving according to European Standard EN 24 497:1993 as approved by the European Committee for Standardization (CEN) on Apr. 2, 1993, wherein EN 24 497:1993 endorses ISO 4497:1983.

A further aspect of the invention relates to a coating produced by a hardfacing technique, such as overlay welding, using any of the alloy compositions disclosed herein. A further aspect of the invention relates to a coated item, the item comprising a coating bonded to a substrate portion thereof, wherein the coating is produced by a hardfacing technique, such as overlay welding, using any of the alloy compositions disclosed herein.

According to some embodiments an item comprises a substrate portion and a coating bonded to the substrate portion, wherein the coating is made using an iron-based alloy composition according to any one of the embodiments disclosed herein. The coating is for hardfacing of the substrate portion. Preferably, the coating is made by an overlay welding process.

Further according to some embodiments of the coated item, the coating is applied by an overlay welding process, such as a plasma transfer arc (PTA) welding process or a laser cladding process. As mentioned above, different hardfacing techniques may have process type specific characteristics influencing the wear resistance properties of the obtained coating. A particular advantage of the iron-based alloy compositions according to embodiments of the invention arises when adapted to or even optimized for a particular hardfacing technique. Both PTA welding and laser cladding techniques have been proven to work particularly well for forming hardfacing coatings using embodiments of the iron-based alloy composition of the invention, wherein PTA-welding and, equivalently other overlay welding techniques with a time dependence of the melt pool formation and/or cool down that is comparable to typical PTA welding processes, are particularly advantageous for the formation of crack free coatings.

Furthermore, the above-mentioned simple tuning mechanism may be used effectively for a well-controlled adaptation of the coating alloy system to specific requirements of the particular coating process to be used, without having to embark on a large investigation of the influence of the numerous further components contained in the alloy.

Further according to some embodiments of the coated item, dilution from the substrate material is below 20%, or below 15%, below 10%, or below 5%, or below 1%.

Further according to some embodiments of the coated item, the coating has a Rockwell hardness HRC of at least 60, at least 63, or at least 65. Further according to some embodiments of the coated item, the coating may have a Rockwell hardness HRC of about 67.

Further according to some embodiments of the coated item, the coating has an abrasive wear resistance as determined according to ASTM G65, procedure A, of, below 15 mm$^3$, below 12 mm$^3$, or below 10 mm$^3$. Further according to some embodiments of the coated item, the coating may have an abrasive wear resistance as determined according to ASTM G65, procedure A, of about 8 mm$^3$. This abrasive wear resistance is comparable to that of NiSiB coatings containing 50-60 wt. % tungsten carbides.

Further according to some embodiments of the coated item, the coating has an impact wear as determined according to the ball impact wear testing method of, about or more than 5 strikes for an impact-energy per strike of 15 J, more than 15 strikes for an impact-energy per strike of 10 J.

Further according to some embodiments of the coated item, the coating has a microstructure comprising primary boride and eutectic matrix material, wherein a ratio of an amount of primary boride by volume to an amount of eutectic matrix material by volume is below 0.3, or below 0.25. Further according to some embodiments of the coated item, the coating has a microstructure comprising primary boride and eutectic matrix material, wherein a ratio of an amount of primary boride by volume to an amount of eutectic matrix material by volume is at least 0.01, or at least 0.03.

As mentioned above, the hardfacing material is typically applied as a coating to a substrate portion of an item. Typical substrates are steel materials, such as used for tooling in any of the applications mentioned above, for example low alloy steel. Iron-based hardfacing materials are composite materials with a microstructure made up of so-called hard-phase particles that are embedded in a matrix of another hard phase.

The hardfacing material is formed in a process of first melting an iron-based alloy composition, such as an iron-based alloy composition according to embodiments of the present invention, which is then allowed to cool down to solidify into the desired form, e.g. as a hardfacing coating. During cool-down, the hard-phase particles are formed prior to the matrix material, i.e. the hard-phase particles are formed by solidification at higher temperatures than the matrix material. The hard-phase particles are therefore also referred to as "primary" hard-phases. When analysing the relative amounts of the different hard phases and matrix materials, the amounts are determined in percent by volume using standard metallurgical techniques based on image analysis.

In hardfacing materials formed using the iron-based alloy composition according to embodiments of the invention, the hard-phase particles are primary carbides and primary borides, wherein elemental mapping as performed by the inventors points to a predominant formation of Vanadium rich carbide particles on the one hand and Molybdenum rich boride particles on the other hand. The elemental mapping performed by the inventors further indicates that the subsequently formed matrix material solidifies as a eutectic structure of Molybdenum rich boride intercalated with Martensite. However, metallurgical image analysis of micrographs held together with elemental mapping data also reveals that the matrix material further tends to comprise Molybdenum depleted islands, which coincide with regions of Boron depletion. These islands may thus be distinguished from regions of eutectic structure by an elemental mapping analysis of the coating material by energy dispersive spectroscopy (EDS). Island regions will appear as regions with a very low signal for Molybdenum and Boron. The EDS analysis is typically performed in a region that is representative of the coating, such as typically within a bulk region of the coating, using standard metallurgical image analysis techniques.

Without being bound by theory, these islands may be attributed to the formation of martensite, which appears to occur as a consequence of Molybdenum and Boron being consumed by the formation of the primary boride particles, prior to the solidification of the matrix material. Moreover, the insight provided by the inventors suggests that the addition of Silicon directly affects the amount of primary borides formed in the hardfacing materials from processing the iron-based alloy composition according to embodiments of the invention, and thus that controlling the Si content is critical in determining the final microstructure of a hardfacing material. As a consequence, controlling the Si content is critical in determining the final properties of a coating. An important insight underlying the present invention is therefore that varying the Silicon content within carefully selected ranges directly affects the amount of primary borides formed at the expense of the amount of eutectic matrix material, which provides a direct handle for adapting the properties of a coating formed from the alloy composition according to embodiments of the invention, e.g. with respect to abrasive wear. For example, providing a first coating having a first ratio of the amount of borides over the amount of eutectic structure, and a second coating having a second ratio of the amount of borides over the amount of eutectic structure that is different as compared to the first ratio, will have different abrasive wear properties. According to embodiments of the present invention, the ratio of the amount of borides to the amount of eutectic structure, and thus the coating properties, may thus be controlled by varying the Silicon content, wherein increasing (lowering) the Silicon content lowers (increases) the resistance to abrasive wear slightly, yet reproducibly. If, e.g., the first ratio is larger than the second ratio, the abrasive wear resistance of the first coating will be lower (higher abrasive wear value when measured using the ASTM G65 procedure A test) as compared to the second coating, and vice versa.

A further aspect of the invention relates to a method of hardfacing a substrate, the method comprising the steps of: providing a substrate; and applying a coating to the substrate using an iron-based alloy composition according to any one of the embodiments disclosed herein as a coating material. Advantageously, the coating is applied by an overlay welding process. Thereby, the same advantages are achieved in an analogous manner, as discussed herein with respect to the iron-based alloy composition, and with respect to hardfacing coatings and coated items produced using the iron-based alloy composition according to any of the embodiments disclosed herein. Typical substrates are steel materials, such as used for tooling in any of the applications mentioned above, for example low alloy steel.

Further according to some embodiments of the method, the overlay welding process is a plasma transfer arc (PTA) welding process or a laser cladding process. Thereby, the same advantages are achieved in an analogous manner, as discussed above.

BRIEF DESCRIPTION OF THE DRAWINGS

The invention will be described in more detail in the following by referring to examples and the appended drawings, wherein the drawings show in FIG. 1 is a graph showing hardness of coatings produced by PTA and laser cladding using different alloy compositions.

DETAILED DESCRIPTION

Figure 1:
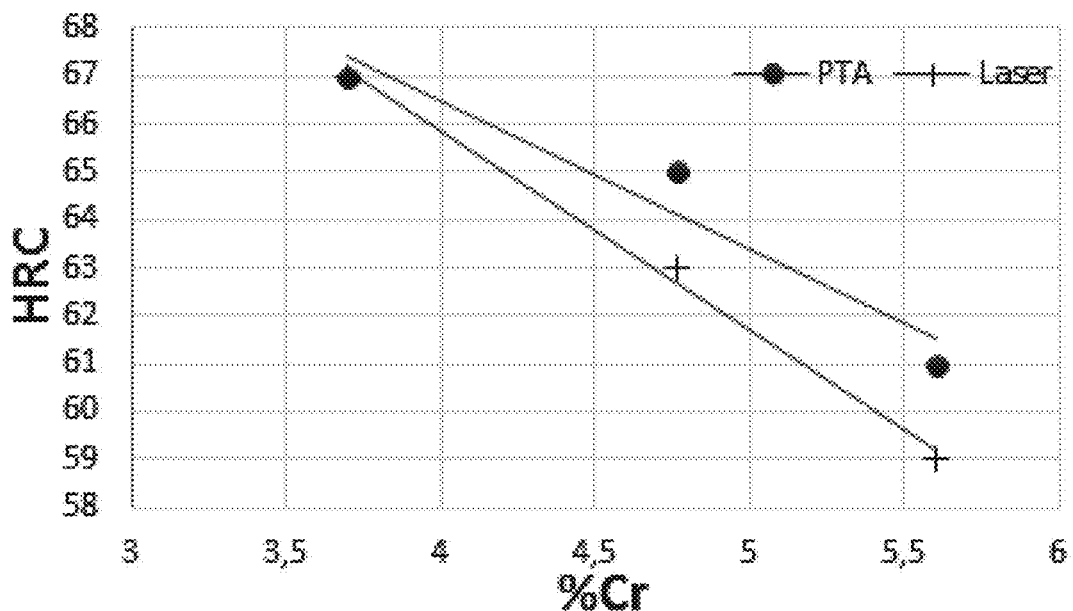

As mentioned above, one drawback of PTA welded and laser cladded coatings made using known iron-based alloy compositions or NiSiB mixes with tungsten carbides is an unsatisfactory wear resistance performance in scenarios of a combination of different wear mechanisms. This is due to a combined effect of microstructure and poor weldability resulting in pore and crack formation in the case of iron based coatings and cracks, sinking and dissolution of the tungsten carbides in the case of NiSiB coating with tungsten carbides. By optimizing the amount of Silicon in iron-based alloy compositions containing selected amounts of Chromium, a surprisingly high hardness and resistance to both abrasive wear and impact wear can be achieved.

In the following, the invention is described by reference to exemplifying alloy compositions with systematically varied chromium (Cr) and silicon (Si) contents. Details of the alloy compositions are given in the MATERIAL section. Details of overlay welding procedures by plasma transfer arc (PTA) welding and laser cladding are given in the PROCESS section. Analysis techniques for characterizing the properties of the processed alloys are described in the EVALUATION section. Analysis results are presented in the RESULTS section, including a discussion of the influence of adding Cr and Si to the iron-based alloy compositions according to embodiments of the present invention.

Examples

Material

Alloy powders REF and 11 to 15 with the chemical composition reported in Table 1 were investigated. The alloys were gas atomized and sieved between 53-150 μm for compatibility with powder feeding devices of the overlay welding equipment.

TABLE 1

Chemical composition of investigated alloys

| Alloy | | C wt. % | B wt. % | Mo wt. % | V wt. % | Mn wt. % | Ni wt. % | Si wt. % | Cr wt. % | Fe wt. % |
|---|---|---|---|---|---|---|---|---|---|---|
| REF | Powder | 2.6 | 2.0 | 17.5 | 12.0 | 0.5 | 1.5 | 0.7 | | Bal |
| 11 | | 2.7 | 2.0 | 17.6 | 11.7 | 0.6 | 1.8 | 0.7 | 3.7 | Bal |
| 12 | | 2.6 | 2.0 | 18.0 | 11.8 | 0.6 | 1.7 | 1.1 | 3.8 | Bal |
| 13 | | 2.6 | 2.0 | 18.3 | 11.9 | 0.5 | 1.6 | 1.4 | 3.9 | Bal |
| 14 | | 2.5 | 1.9 | 17.7 | 11.9 | 0.5 | 1.5 | 0.9 | 4.8 | Bal |
| 15 | | 2.4 | 1.9 | 17.6 | 11.9 | 0.5 | 1.5 | 0.9 | 5.6 | Bal |
| 26 | Ingots | 2.6 | 1.7 | 17.2 | 11.7 | 0.4 | 1.2 | 0.3 | 4.0 | Bal |
| 27 | | 2.7 | 1.8 | 17.7 | 12.1 | 0.3 | 1.2 | 1.0 | 4.1 | Bal |
| 28 | | 2.6 | 1.8 | 17.3 | 12.0 | 0.3 | 1.2 | 2.0 | 4.0 | Bal |
| 29 | | 2.6 | 1.7 | 17.2 | 11.8 | 0.3 | 1.1 | 0.5 | 1.9 | Bal |
| 30 | | 2.2 | 1.7 | 17.5 | 12.1 | 0.2 | 1.1 | 0.7 | 5.7 | Bal |

Process a) PTA Welding

Alloy 11-15 in Table 1 were deposited on EN S235JR mild structural steel plates using a commercial PTA unit (Commersald 3001). One layer, single track clads were deposited on a substrate with size 125×40×20 [mm] using the welding parameters in Table 2. A mix of Argon and 5% H₂ with flow rate of 16.5 l/min was used as shield gas to protect the melt pool from oxidation. Argon with flow of 2.0 l/min was used to transport the powder from the hopper to the melt pool. Pilot gas was 2.0 l/min. The samples coated with the parameters in Table 2 were used for measurements of coating hardness, dilution and microstructure.

TABLE 2

PTA welding parameters for coating of 125 × 40 × 20 mm substrates, one layer, single track

| Substrate T(° C.) | Feed rate g/min | Speed cm/min | Power A | Oscillation (mm/min) | Cooling |
|---|---|---|---|---|---|
| RT | 25 | 8 | 125 | 10 | Air |

Clads consisting of two overlapping tracks were deposited on a substrate with size 220×60×30 [mm]. Overlap between the two adjacent clads was 3 mm and oscillation of the PTA torch 10 mm. The clads were deposited using the welding parameters in Table 3 on room temperature substrates. The coated samples were cooled in vermiculate. A mix of Argon and 5% H₂ with flow rate of 16.5 l/min was used as shield. Argon, flow 2.0 l/min was used as transport gas. Pilot gas was 2.0 l/min. Blanks with size requested by ASTM G65 were cut out from these samples, plane grinded and tested for resistance to abrasive wear.

TABLE 3

PTA welding parameters for coating of 220 × 60 × 30 mm substrates, one layer, two overlapping tracks

| Alloy | Substrate T(° C.) | Feed rate g/min | Speed cm/min | Power A | Cooling |
|---|---|---|---|---|---|
| 11, 13, 15, | RT | 25 | 8 | 120 | Air | b) Laser Cladding

Laser cladding was performed using an IPG 6 kW fibre coupled diode laser with a Coax 8 powder feed nozzle and a 5 mm round spot. The process window was typically determined using two laser travel speeds, 16 and 8 mm/s. Powder feed rate was designed to give approximately 1 mm thick coatings. The laser power was varied between 1000 to 2500 W. Argon, 15 l/min, was used as shielding gas. Argon, 6 l/min, was used as transport gas for the powder. The powders were deposited on EN S235JR mild steel substrates with size 100×35×10 mm pre-heated at 200° C. Six tracks were deposited with 50% overlap. Welding parameters investigated are summarized in Table 4. Cross section of the cladded samples were checked for degree of bonding to the substrate, interface porosity and dilution from the substrate by using optical microscopy. The samples with good bonding to the substrate and dilution <10%, were selected for evaluation of the coating properties.

TABLE 4

Laser cladding parameters used for coating of 100 × 35 × 10 mm EN S235JR substrate, 6 overlapping tracks

| Test | Laser Power [W] | Robot Speed [mm/sec] | Powder flow [g/min] | Comment |
|---|---|---|---|---|
| A | 1500 | 16 | 20 | Poor bonding to the substrate |
| B | 2000 | 16 | 20 | Good bonding, dilution <5% |
| C | 2500 | 16 | 20 | Good bonding, dilution approx. 5-10% |
| D | 1000 | 8 | 13 | Poor bonding to the substrate |
| E | 1500 | 8 | 13 | Good bonding, dilution <5% |
| F | 2000 | 8 | 13 | Good bonding, dilution approx. 5-10% |

Pucks with size 80×80×30 mm were coated for production of abrasive wear test samples according to ASTM G65, procedure A. Two samples with size 58×25×30 mm were cut out from each puck. The samples were than plane grinded to fulfil the requirements for the abrasive wear test.

TABLE 5

Laser cladding parameters used for coating of 80 × 80 × 30 mm EN S235JR substrate

| Alloy | Power [W] | Speed [mm/sec] | Powder flow [g/min] |
|---|---|---|---|
| 11 | 2500 | 16 | 25 |
| 13 | 2500 | 16 | 25 |
| 15 | 2500 | 16 | 25 |

Evaluation

The clads were investigated for presence of cracks and other surface flaws. They were cleaned (CRC Crick 110) and then coated with a red dye (CRC Crick 120) penetrating into surface defects or cracks through capillary forces. After 10 minutes excess dye was removed from the surface and a white developer (CRC Crick 130) applied. The developer drew the penetrant out of crevices, cracks or other hollow imperfections communicating with the surface and coloured them in red.

Rockwell hardness HRC was measured using a Wolpert Universal hardness tester. The coatings were ground. Seven hardness indents were performed on the flat surface and the average was calculated.

For measuring dilution from the substrate the coated samples were sectioned perpendicular to the coating direction and then ground on SiC paper. The cross section was examined using a stereomicroscope and dilution was determined geometrically. Prior to measurement, the samples were etched in Nital 1% to attack the substrate material and in this way facilitate the detection of the coating. The as-grinded coating cross section were photographed using a Leica stereomicroscope. The total coating area ($A_{coating}+A_{substrate}$) and the area of the coating that used to be substrate prior to overlay welding ($A_{substrate}$) were measured by image analysis. Dilution from the substrate material by cross-sectional area was thus calculated as defined in the following equation:

$$\text{Dilution in \%}=((A_{substrate})/(A_{coating}+A_{substrate}))\times 100$$

For analysis of the coatings quality and microstructure and in some cases measurement of the geometrical dilution from the substrate the samples were than moulded in Bakelite, ground and polished using standard procedures for metallographic sample preparation. Oxide polishing with colloidal $SiO_2$ was used as the final step of metallographic sample preparation. The coatings cross section was examined using a light optical microscope (Leica DM 6000) and a FEGSEM (Hitachi FU6600) equipped with a silicon drift detector (SDD) for EDS analysis (Quantax 800 Bruker). EDS maps for Mo and V were used to evaluate the volume fraction of phases present in the coatings by image analysis.

Low stress abrasive wear testing was performed according to ASTM G65 standard (ASTM G65: Standard Test Method for Measuring Abrasion Using the Dry Sand/Rubber Wheel Apparatus, 2010), procedure A, by using a commercial multiplex sand/wheel abrasion tribometer (Phoenix tribology TE 65). Five sample replicas per material were tested.

Figure 8:
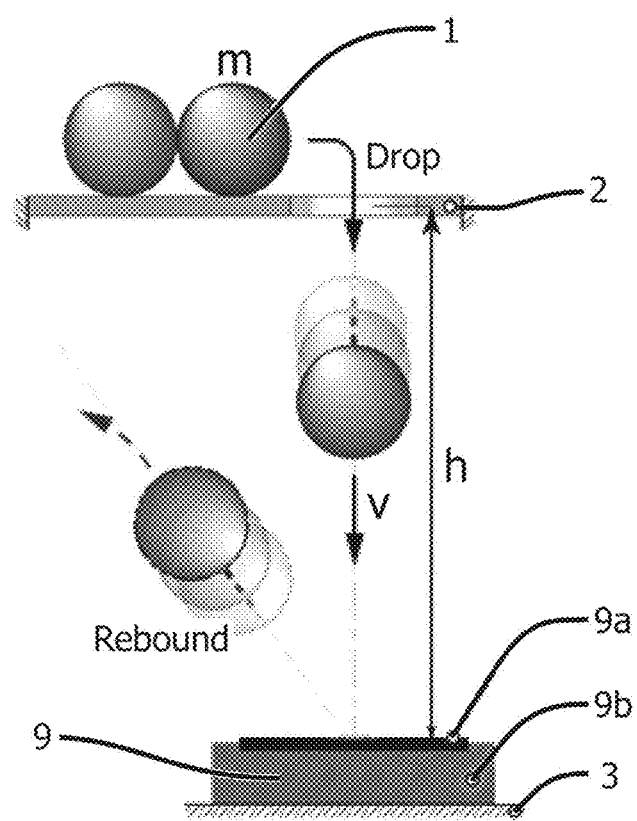

Impact wear testing was performed by using an in-house build test rig. A schematic of the set-up is shown in FIG. 8. Standard steel bearing balls of mass m drop from pre-defined heights onto the coated test specimen. The potential energy (Ep) of each ball is Ep=m h g, wherein m is the mass of the ball, h is the drop height, and g is the gravitational constant. By varying the mass of the steel balls and the height from which they are dropped different potential energies i.e. impact energies are simulated. A data point corresponds to the total number of ball strikes for a pre-defined height, i.e. impact energy, until occurrence of a first circular crack around the impact dent. This type of model impact wear testing is suitable to rank impact wear resistance of materials exposed to impact overloads at relatively low impact velocities. Operation conditions closest to the modelling in this testing can be exemplified by a first contact of the excavator bucket teeth with the ground; by filling of the excavator buckets by the dig-out material; by forwarding the dig-out material to the truck bed etc. Abrasive wear is removed from this testing in difference to a combined abrasive-impact wear testing.

Results

Dilution, abrasive wear resistance (AW) and hardness HRC of alloys 11-15 as processed into a hardfacing coating by PTA-welding and laser cladding are summarised in Table 6.

TABLE 6

Dilution, abrasive wear resistance and HRC of the alloys 11-15 as PTA welded and laser cladded

| | PTA welding | | | Laser cladding | | |
|---|---|---|---|---|---|---|
| Alloy | Dilution % | HRC | AW (mm$^3$) | Dilution % | HRC | AW (mm$^3$) |
| REF | <10 | 68 | 8.0 | <5 | 67 | 9.0 |
| 11 | 8 | 68 | 9.0 | <5 | 67 | 7.8 |
| 12 | 8 | 67 | | <5 | 67 | |
| 13 | 10 | 66 | 11.7 | <5 | 63 | 10.9 |
| 14 | 5 | 65 | | <5 | 63 | |
| 15 | 8 | 64 | 12.0 | <5 | 59 | 17.5 |

In Alloy 11-14 with 3.5 to 5 wt. % Chromium abrasive wear resistance is below 12 mm$^3$ and hardness HRC is above 65 units. This level of resistance to abrasive wear is comparable to NiSiB mixes with tungsten carbides, which are state of the art alloys in applications exposed to severe abrasive wear, but is achieved at lower material cost. This level of resistance to abrasive wear is also comparable to the reference alloy (REF). When increasing the amount of Cr to 6% both hardness and abrasive wear resistance drops.

Figure 2:
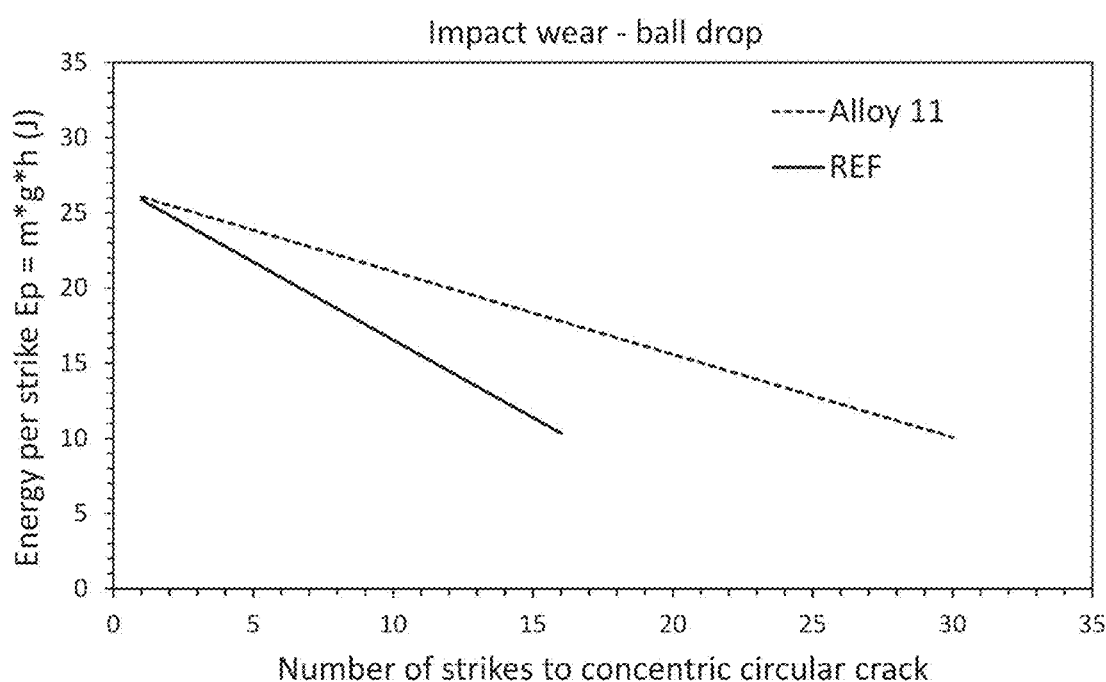
FIG. 2 is a graph plotting impact energy as a function of number of strikes to achieve the first crack, for alloy composition Alloy 11 and the reference alloy REF.

By adequate additions of Chromium and Silicon according to embodiments of the present invention, a surprising combination of high hardness, abrasive wear resistance and impact resistance is achieved when the iron-based alloy compositions are processed into a hardfacing coating. This is e.g. shown by the hardness and abrasive wear resistance data for the alloys in Table 6 and the graph of FIG. 1 showing the hardness of PTA-welded coatings made from iron-based alloy compositions with different Chromium content. In particular, alloys with a Chromium content between 3.5 wt. % and about 5 wt. % and a Silicon content above 0.2 wt. %, such as above 0.5 wt. %, such as above 0.6 wt. % show a good combination of hardness and abrasive wear combined with significantly improved resistance to impact as illustrated in FIG. 2. While samples of the reference alloy (REF) without or low Chromium content and a corresponding Si content exhibit a lower impact wear resistance especially at low impact energies below 15 J, the combined addition of both Chromium and Silicon in selected amounts provides the above-mentioned surprising combination of wear resistance properties.

Impact resistance data is shown in FIG. 2. FIG. 2 shows the impact energy per strike as a function of the number of strikes needed to achieve the first crack in the coating. The graph shows data for the iron-based alloy composition Alloy 11 and the reference alloy REF. Each of the plotted lines is a linear regression to measurements obtained on at least two samples of the respective alloy, wherein measurement points have been collected for energies per strike of 30 J, 25 J, 20 J, 15 J, and 10 J. The corresponding regression data are given in Table 8 below. The best performing samples may show a so-called run-out behaviour, where at the lowest impact energies per strike no crack formation is observed, or at least not observed in a reproducible manner, within a large number of strikes of up to 100 strikes. Data points showing such a run-out behaviour were not included in the linear regression. The diagram shows that towards lower impact energies per strike the coatings made using alloy composition Alloy 11 can withstand considerably more accumulated impact energy as expressed in number of strikes before the first crack is formed when compared to the reference alloy (REF) without Chromium. For an impact-energy of 10 J, about 15 strikes are needed to form the first crack in the reference alloy (REF), while more than 25 strikes or even 30 strikes are needed for the alloy composition Alloy 11.

Figure 5:
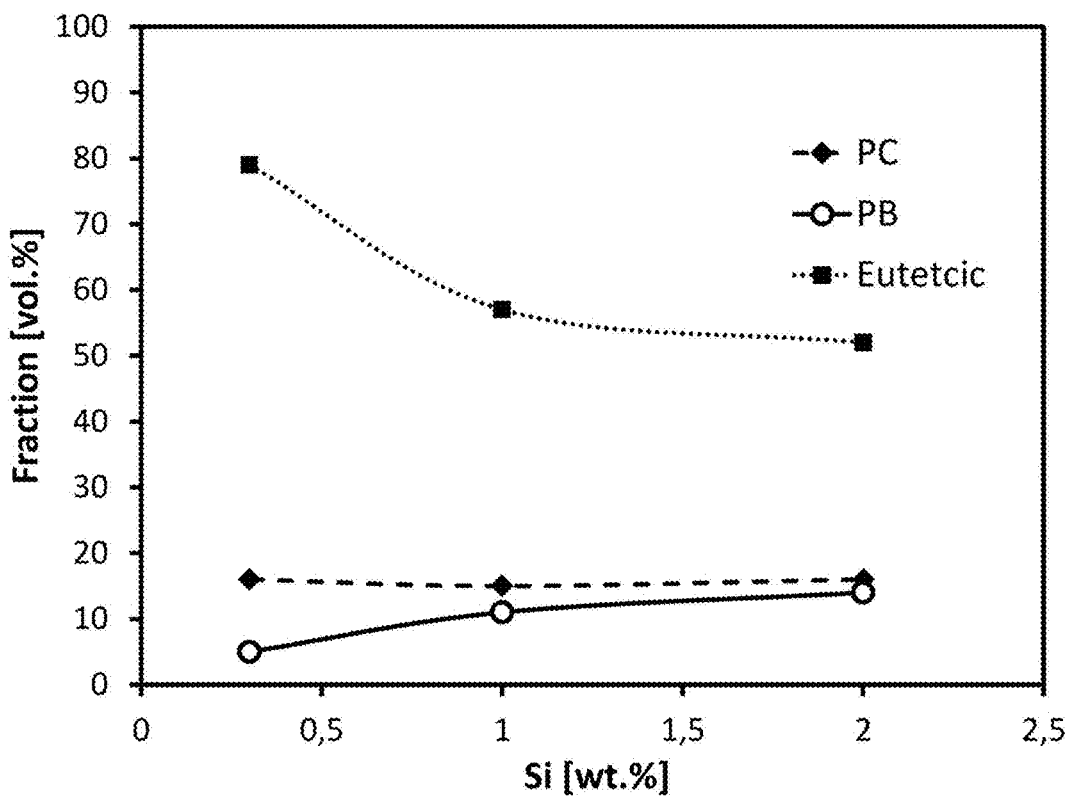
FIG. 5 is a graph showing the influence of the addition of Si on the microstructure of processed alloys.

One important insight underlying the present invention relies on an analysis of the microstructure of the alloys when processed by melting and subsequent cooling to form a (re-)solidified coating, as further explained by way of example below. The microstructure analysis reveals that the skilled person may use the present invention to design an alloy composition optimized for a particular application by setting the Chromium content of the iron-based alloy composition, and further adding Silicon within carefully selected ranges allowing for tuning the distribution of different phases in the microstructure of the processed material, in order to achieve desired properties of combined wear resistance including combinations of hardness, abrasive wear, impact wear, and/or coating quality. Notably, Silicon was found to affect the amount of primary hard phase particles formed in the iron-based alloy compositions with Cr addition, more particularly the amount of primary boride particles as best seen in FIG. 5. A particularly advantageous range for the Silicon content for tuning the alloy properties was found to occur below 1.5 wt. %, or below 1.4 wt. %, or below 1.3 wt. %, or below 1.2 wt. %, or below 1.1 wt. %, or below 1 wt. %, and above 0.2 wt. %, or above 0.3 wt. %, or above 0.4 wt. %, or above 0.5 wt. %, or above 0.6 wt. %.

For a systematic implementation, the skilled person designing an alloy composition according to desired wear resistance properties may develop information on the phase formation properties of the alloy composition by producing a sample of processed alloy and analysing the microstructure of the sample with respect to its phase composition, and advantageously with respect to the fractions of primary boride particles and of eutectic matrix material in the processed alloy material. For the purposes of analysing different alloy compositions in a systematic implementation of the invention, the skilled person may e.g. prepare samples by melting the corresponding iron-based compositions and casting them into ingots that are polished for a microstructure analysis according to known metallurgical analysis techniques.

An example of such a microstructure analysis is given in the following. Alloys with a Cr content of 4 wt. % and a Si content varying between 0.2 wt. % to 2 wt. % were melted in an induction furnace and then poured in a copper mould. Furthermore, ingots with a Cr content of 1.9 wt. % and 5.7 wt. %, and with a Si content of 0.5 wt. % and 0.7 wt. %, respectively were prepared in the same manner. Chemical composition of the produced ingots was analysed and the results are reported in Table 1 as alloys 26, 27, 28, 29, and 30. The microstructure was investigated using a SEM equipped with EDS detector for energy-dispersive X-ray spectroscopy. Examples of SEM micrographs are seen in FIGS. 3a-3c for alloy compositions Alloy 26, 27, and 28, and in FIGS. 4a and 4b for alloy compositions Alloy 29 and 30, respectively.

Figure 3A:
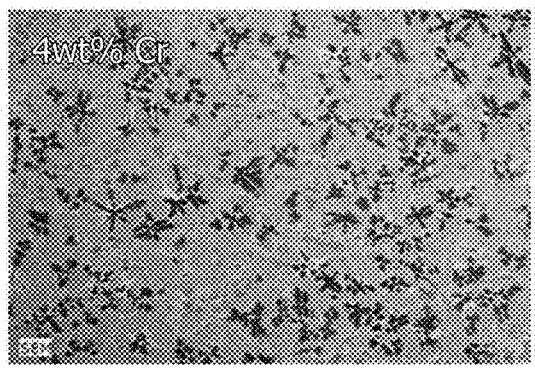
FIGS. 3a-3c are SEM micrographs showing the microstructure of three different alloys processed into ingot samples.
Figure 3B:
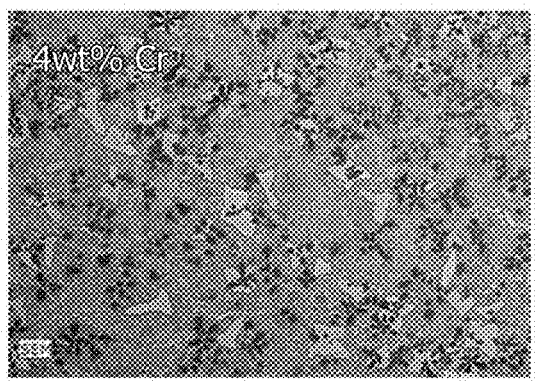
Figure 3C:
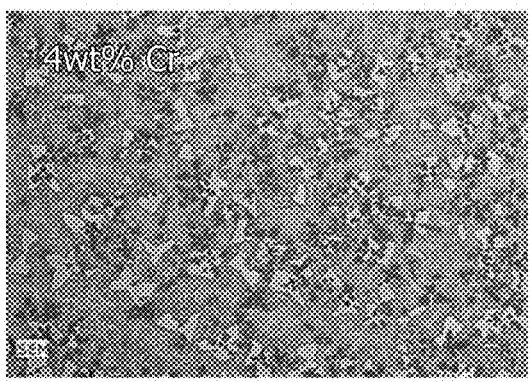
Figure 4A:
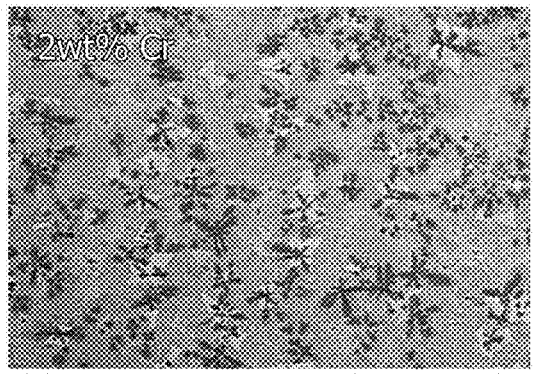
FIGS. 4a-4b are SEM micrographs showing the microstructure of two different alloys processed into ingot samples.
Figure 4B:
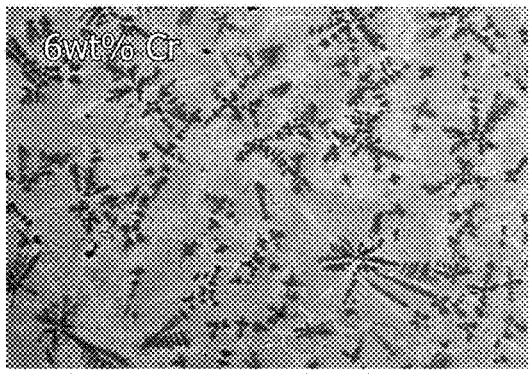

FIGS. 3a-3c show the microstructure of the ingots from alloy compositions 26-28 with 4 wt. % of Cr, as seen in SEM BSE (back scatter) micrographs, wherein alloy composition 26 has 0.2 wt. % Si (FIG. 3a); alloy composition 27 has 1 wt. % Si (FIG. 3b); and alloy composition 28 has 2 wt. % Si (FIG. 3c). FIGS. 4a-4b show the microstructure of the ingots from alloy compositions 29-30 as seen in SEM BSE (back scatter) micrographs, wherein alloy composition 29 has 1.9 wt. % Cr and 0.5 wt. % Si (FIG. 4a); and alloy composition 30 has 5.7 wt. % of Cr and 0.7 wt. % Si (FIG. 4b).

Figure 6:
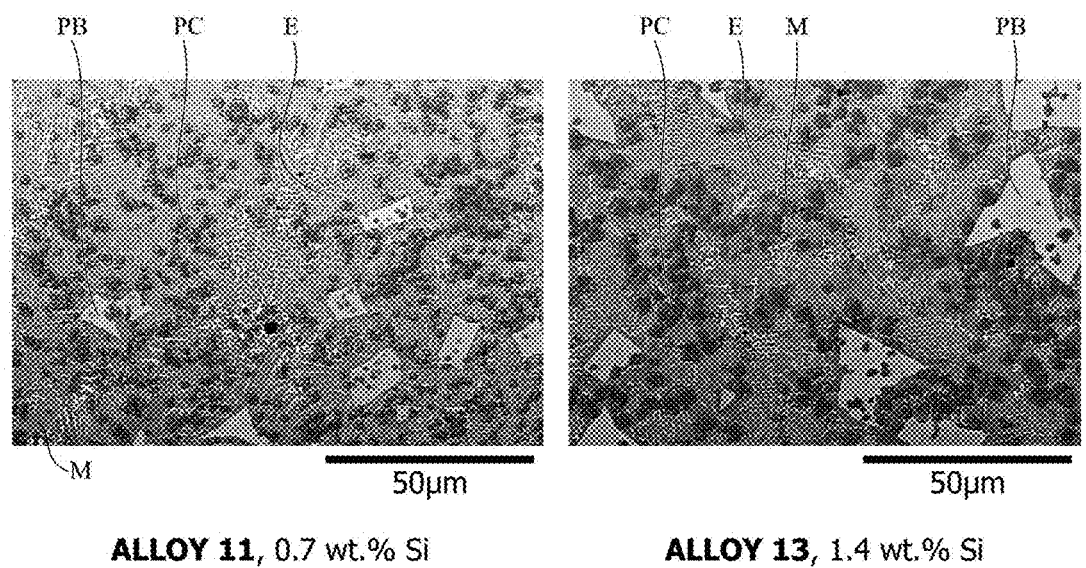
FIG. 6 has micrographs showing the microstructure of two different alloys processed into coatings by PTA welding.
Figure 7A:
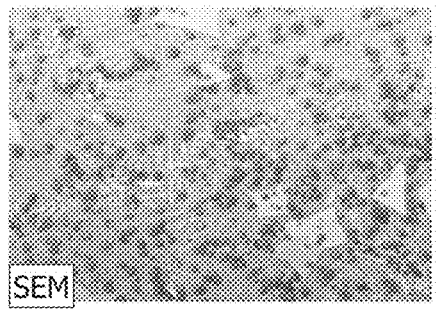
FIGS. 7a-7h are energy dispersive SEM micrographs showing elemental mapping of V, Mo, Cr, Fe, Si, C, and B for one example of an alloy; and in FIG. 8 is a schematic arrangement for testing impact wear resistance according to the ball drop method.
Figure 7B:
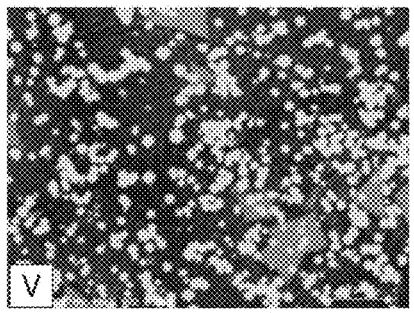
Figure 7C:
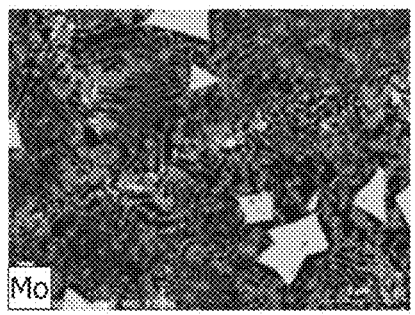
Figure 7D:
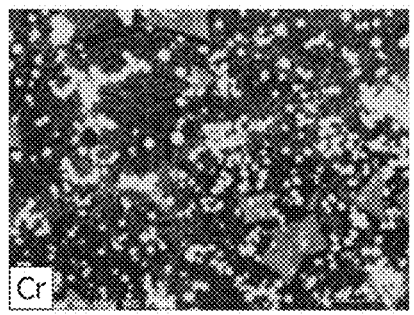
Figure 7E:
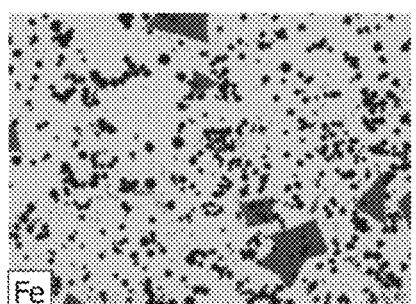
Figure 7F:
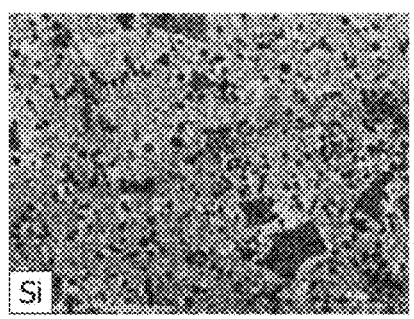
Figure 7G:
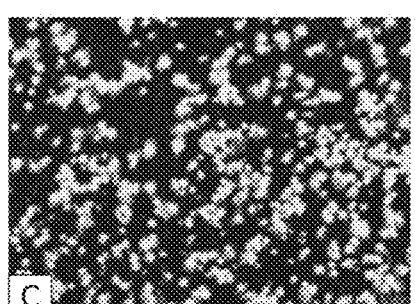
Figure 7H:
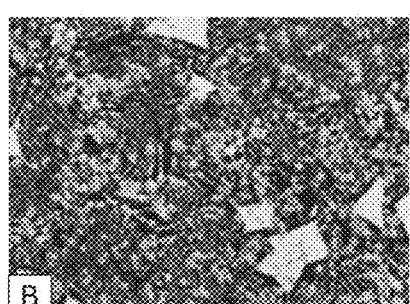

FIG. 6. shows the microstructure of coatings made by PTA-welding using alloy compositions Alloy 11 and Alloy 13, as seen in SEM BSE (back scatter) micrographs, wherein alloy composition 11 has 3.7 wt. % Cr and 0.7 wt. % Si; and alloy composition 13 has 3.9 wt. % of Cr and 1.4 wt. % Si.

The microstructure consists of primary carbides (PC, dark grey), primary borides (PB, white/light grey particles), eutectic structure consisting of Molybdenum rich borides and martensite as well as martensitic islands. An example of elemental mapping of V, Mo, Cr, Fe, Si, C, and B using EDS is shown in FIGS. 7a-7h for alloy composition 11.

Variations in the amount of primary borides (PB, open circles), primary carbides (PC, solid diamonds), and eutectic structure (Eutectic, solid squares) with increased Si content is shown in FIG. 5 for ingot samples made from alloy compositions 26-28. The volume fraction of primary carbide is similar for all four alloys and approx. 17 vol. %. The diagram shows that by increasing the amount of Si the volume fraction of primary borides (PB) increases, while the amount of eutectic structure (Eutectic) decreases. Most notably, Silicon was found to influence the amount of primary hard phase particles formed in the iron-based alloy composition with Cr additions when varied within ranges below 2 wt. % of Si, with advantageous ranges as given above. A particularly pronounced response is seen in the range around and below 1 wt. % Si. The amount of primary borides (PB) as compared to the amount of eutectic structure (Eutectic) affects the abrasive wear resistance of a clad. Controlling the Si content is therefore a most useful tool in determining the final microstructure of an alloy, and as a consequence the final properties of a clad.

Similar results were obtained on PTA welded coatings using alloy compositions 11 and 13, as summarized in Table 7.

TABLE 7

Volume fraction of phases present in PTA welded alloys with different Si content and abrasive wear (AW) resistance

| Alloy | Cr wt. % | Si wt. % | PC vol. % | PB vol. % | Mart vol. % | Eutectic vol. % | AW (mm³) |
|---|---|---|---|---|---|---|---|
| 11 | 4 | 0.7 | 17 | 4 | 5 | 74 | 9.0 |
| 13 | 4 | 1.4 | 17 | 10 | 11 | 65 | 11.7 |

TABLE 8

Linear regression data for impact wear measurements using the ball drop method

| Alloy | Slope [J/strike] | Intercept [J/strike] | R^2 |
|---|---|---|---|
| 11 | −0.55 | 26.6 | 0.66 |
| REF | −1.0 | 26.9 | 0.77 |

The invention claimed is:

1. An item comprising a substrate portion and a coating bonded to the substrate portion, wherein the coating is made using an iron-based alloy composition as a coating material, the composition comprising:
   boron (B): 1.6-2.4 wt. %;
   carbon (C): 2.2-3.0 wt. %;
   chromium (Cr): 3.5-5.0 wt. %;
   manganese (Mn): below 0.8 wt. %;
   molybdenum (Mo): 16.0-19.5 wt. %;
   nickel (Ni): 1.0-2.0 wt. %;
   silicon (Si): 0.2-2.0 wt. %;
   vanadium (V): 10.8-13.2 wt. %;
   and balanced with iron (Fe) and unavoidable impurities.

2. The item according to claim 1, wherein the coating is applied by an overlay welding process.

3. The item according to claim 1, wherein dilution from the substrate material is below 20%.

4. The item according to claim 1, wherein the coating has a Rockwell hardness HRC of at least 60.

5. The item according to claim 1, wherein the coating has an abrasive wear resistance as determined according to ASTM G65, procedure A, of, below 15 mm³.

6. The item according to claim 1, wherein the coating has an impact wear as determined according to the ball impact wear testing method of more than 5 strikes for an impact energy per strike of 15 J, and more than 15 strikes for an impact energy per strike of 10 J.

7. The item according to claim 1, wherein the coating has a microstructure comprising primary boride and eutectic matrix, wherein a ratio of an amount of primary boride by volume to an amount of eutectic matrix by volume is below 0.3.

8. Method of hardfacing a substrate, the method comprising the steps of:
   providing a substrate;
   applying a coating to the substrate using an iron-based alloy composition as a coating material, the composition comprising:
   boron (B): 1.6-2.4 wt. %;
   carbon (C): 2.2-3.0 wt. %;
   chromium (Cr): 3.5-5.0 wt. %;
   manganese (Mn): below 0.8 wt. %;
   molybdenum (Mo): 16.0-19.5 wt. %;
   nickel (Ni): 1.0-2.0 wt. %;
   silicon (Si): 0.2-2.0 wt. %;
   vanadium (V): 10.8-13.2 wt. %;
   and balanced with iron (Fe) and unavoidable impurities.

9. The method according to claim 8, wherein the coating is applied by an overlay welding process.

* * * * *